(12) United States Patent
Meeder (10) Patent No.: US 6,874,527 B2
(45) Date of Patent: Apr. 5, 2005

(54) ASSEMBLY AND METHOD OF MOUNTING A LIQUID DELIVERY DEVICE UTILIZING EXPANDING BUSHING

(76) Inventor: Ernest P. Meeder, 8673 Longwood Dr., Largo, FL (US) 33777

( * ) Notice: Subject to any disclaimer, the term of this patent is extended or adjusted under 35 U.S.C. 154(b) by 0 days.

(21) Appl. No.: 10/790,458

(22) Filed: Mar. 1, 2004

(65) Prior Publication Data

US 2004/0231049 A1 Nov. 25, 2004

Related U.S. Application Data

(63) Continuation of application No. 10/112,607, filed on Mar. 29, 2002, now abandoned.
(60) Provisional application No. 60/279,470, filed on Mar. 29, 2001, provisional application No. 60/279,479, filed on Mar. 29, 2001, and provisional application No. 60/279,480, filed on Mar. 29, 2001.

(51) Int. Cl.$^7$ ................................................. F03C 1/04
(52) U.S. Cl. ...................... 137/359; 137/360; 137/606; 137/801; 4/676; 285/193
(58) Field of Search .................................. 137/359, 360, 137/801; 4/676; 285/193

(56) References Cited

U.S. PATENT DOCUMENTS

| | | | | |
|---|---|---|---|---|
| 999,332 A | * | 8/1911 | Mueller | ...................... 285/46 |
| 1,943,140 A | * | 1/1934 | Niedecken | ................... 137/359 |
| 2,708,449 A | * | 5/1955 | Keithley | ..................... 137/359 |
| 3,331,386 A | * | 7/1967 | Politz | ......................... 137/359 |
| 6,405,749 B1 | * | 6/2002 | Bloom et al. | ............... 137/359 |

* cited by examiner

Primary Examiner—A. Michael Chambers
(74) Attorney, Agent, or Firm—Edward D. Gilhooly (57) ABSTRACT

A flanged bushing top portion is applied to a sink or counter surface over a mounting hole with a skirt portion descending from the top portion of the flanged bushing in to the mounting hole. A tapered expansion sleeve is threaded into the skirt portion of the flanged bushing. As the tapered expansion sleeve is threaded upwards into the tapered skirt portion, the skirt expands and pressed against the inside diameter of the sink mounting hole thereby securing the flanged bushing to the sink surface. A faucet valve assembly, soap/lotion dispenser, or water dispenser is lowered into the bores of the flanged bushing and the expansion sleeve, and the valve's escutcheon collar is secured to the top of the flanged bushing by means of a lock down collar which is threaded onto the exterior threads of the flange of the flanged bushing. This secures the valve assembly, soap/lotion dispenser, or water dispenser to the flanged bushing and consequently to the sink. This same method is utilized to attach the faucet spout securely to the sink.

21 Claims, 7 Drawing Sheets

ASSEMBLY AND METHOD OF MOUNTING A LIQUID DELIVERY DEVICE UTILIZING EXPANDING BUSHING

This is a continuation of application Ser. No. 10/112,607, filed Mar. 29, 2002, now abandoned.

This application claims benefit of the priority date of provisional applications, Ser. No. 60/279,470 filed Mar. 29, 2001; Ser. No. 60/279,479 filed Mar. 29, 2001; and Ser. No. 60/279,480 filed Mar. 29, 2001.

BACKGROUND OF THE INVENTION

1. Field of the Invention

This invention relates to a multiple valve faucet mounting system for a multiple valve faucet, soap/lotion dispenser, or water dispenser. More particularly, it relates to a method for mounting a liquid delivery device, such as a unitary flow faucet valve or spout, in a soap/lotion dispenser or water dispenser mounting hole solely from the top of the sink.

2. Description of the Prior Art

Generally, the prior art describes mounting a faucet valve body on a sink or bathtub deck, soap/lotion dispenser, or water dispenser, by means of nuts and washers threaded around the valve body and tightened from below the sink or bathtub deck. This is time consuming and annoying since space under the sink or bath tub deck is limited and difficult to work within. A method is needed to secure a faucet valve, soap/lotion dispenser or water dispenser to the sink or bath tub deck without the need to work from below the sink or bath tub deck, but solely from the top of the sink or bath tub deck.

Several prior art methods employing coupling devices for mounting a structure exist.

U.S. Pat. No. 4,068,858 describes a handle bar mounting member on a bicycle. A tubular shank extends into the steering column and there is a wedge being wedged into place. A wedge bolt extends from the top of the handle bar mounting member and through the tubular shank. This moves the wedge into its wedging position.

U.S. Pat. No. 5,025,826 describes a faucet handles universal coupling. There are a plurality of jaws having inner surfaces for engaging a valve stem peripheral surface and a group of outer camming surfaces. As a screw is tightened, the forces on the tapered surface press the inner surface of the inner jaws tightly against the valve stem's peripheral surfaces.

U.S. Pat. No. 5,176,464 describes a mechanical coupling apparatus which includes an elongated driven member having an axial extremity. There is a first sleeve including at least a first wedge shaped surface having generally planer faces and a thin cross-sectional axial part and thick cross-section axial part. The drive and driven members are disposed with the drive surfaces disposed in nested axially overlapping relationship with the first wedge shaped surface disposed radially intermediate the respective drive surfaces.

U.S. Pat. No. 5,190,393 describes an expandable device for attaching a shaft to a hub. The shaft has a truncated conical end. An expandable sleeve mates with the truncated conical end of the shaft. A threaded washer enables a screw to be used to tighten the parts together.

U.S. Pat. No. 5,538,536 describes a link for pivotally connecting one member to a second member. The shaft is positioned in the aligned holes. The shaft has a central axis extending between a pair of threaded ends of the shaft. An expandable internally tapered wedge sleeve is mounted on each of the tapering end portions of the shaft. A nut is threaded on each end of the shaft. The nuts move the wedge sleeve members along the inclined outer surface of the tapering end portions of the shaft. Each sleeve member has a plurality of peripheral segments.

U.S. Pat. No. 5,737,974 describes a fastening assembly for a handlebar upright tube. The assembly has a tightening head 3 that fits inside the arresting tube 4. By screwing down on the nut 2, the tightening head is tightened against the inner surfaces of the arresting tube 4.

None of the above methods or systems can be satisfactorily employed for easily mounting a faucet and the like to a sink or bathtub deck. A better method is needed.

SUMMARY OF THE INVENTION

The annoyance of attaching a fluid delivery device such as a multiple valve faucet, soap/lotion dispenser, or water dispenser to a sink or bathtub deck by working under the sink or deck, is eliminated by the method of this invention. In the method of this invention an upper portion of a flanged bushing having a diameter greater than the mounting hole in a sink or bath tub deck, is inserted over the hole with the lower portion skirt of the flange bushing descending into the mounting hole. The flanged bushing has a conical bore with the lesser diameter located on the flanged area of the bushing. The conical surface of the bore of the flanged bushing bore is threaded. The lower portion of the flange bushing skirt encloses a conical threaded expansion sleeve or bushing. As the conical expansion sleeve is turned, utilizing vertical key slots in the bore of the expansion bushing, the expansion sleeve moves upwards into the flange bushing skirt and thereby expanding the skirt having flexible spaced fingers to force the exterior surface of the skirt against the interior surface of the mounting hole. A fluid delivery device such as a faucet valve body or spout, soap/lotion dispenser, or water dispenser is lowered through the bores of the flange bushing and expansion bushing. An escutcheon is secured to the top surface of the flange bushing by means of a threaded collar engaging the outside threaded edges of the flanged bushing to be fixed by attaching the valve body, soap/lotion dispenser, or water dispenser or sprayer to the sink or bath tub deck without the need to make adjustments from below the sink or deck.

DESCRIPTION OF THE PREFERRED EMBODIMENTS

Figure 1A:
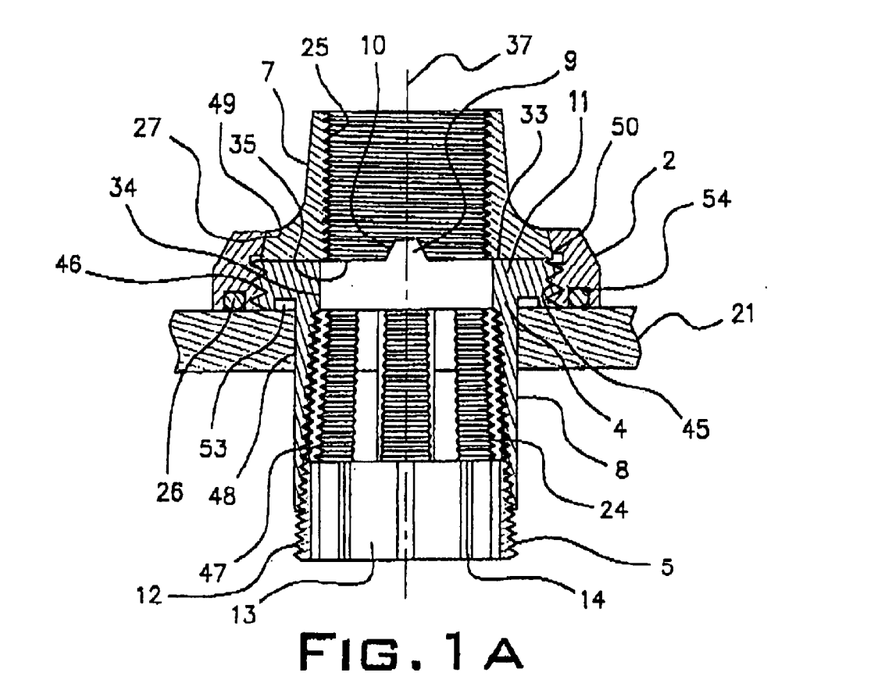
FIG. 1A is a side elevational view, with parts in section, of the mounting assembly for multiple valve faucet, soap/lotion dispenser, or water dispenser in an unexpanded mounted position of the invention.
Figure 1B:
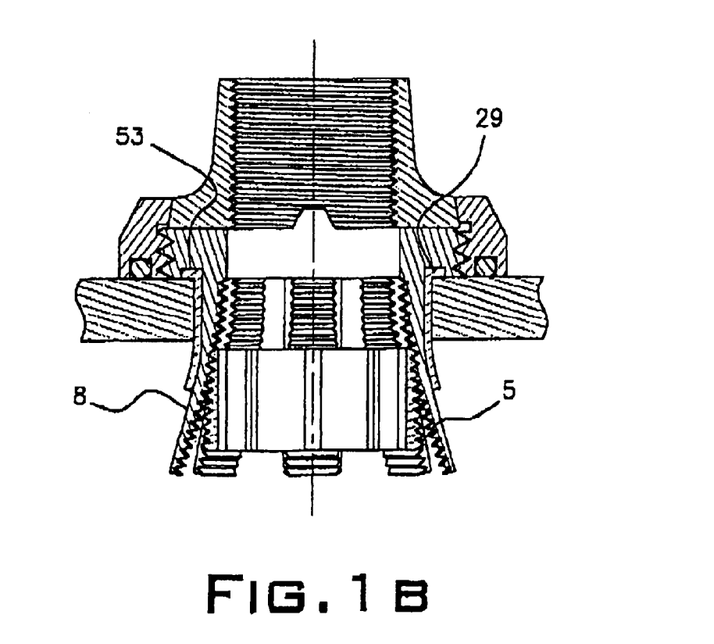
FIG. 1B is a side elevational view, with parts in section, of the mounting assembly of FIG. 1 in a mounted expanded configuration.
Figure 3:
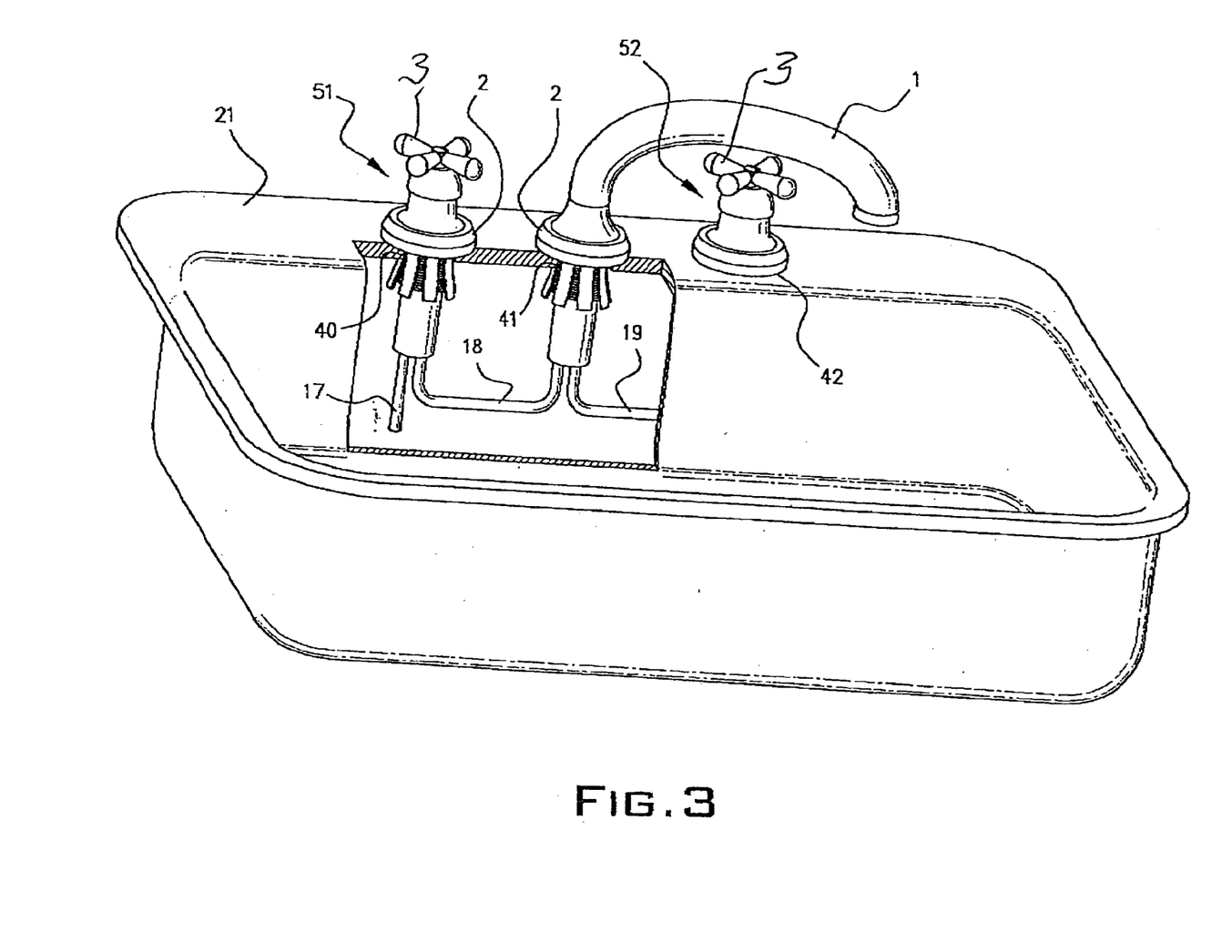
FIG. 3 is a front perspective view, with parts in section, of the mounting assembly of the invention mounting a multi-valve assembly.

The invention may be best understood by those having ordinary skill in the art by reference to the following detailed description when considered in conjunction with the accompanying drawings in which:

In FIGS. 1A and 1B the essence of this assembly and method in a cross sectional view for mounting a fluid delivery device on a sink or tub is illustrated. A flanged bushing 4 formed of plastic or metal is positioned with the lower plane of its flange 11 lying flat on the surface of the sink 21 (FIGS. 1 and 3). The flanged bushing 4 has a skirt 8 downwardly projecting from the flange 11 through the mounting hole 48 in the sink 21. The flanged bushing 4 has a through bore along the axis 37. The through bore 34 is cylindrical 34 in shape from the top surface 33 of the flanged bushing 4 downwards at an equal length to the thickness of the flange 11. From the lower edge of the cylindrical bore 34, the bore increases in diameter forming a truncated conical shape within the skirt 8 with the major diameter of the cone being located at the base of the skirt 8. The skirt 8 consists of a number of flexible spaced fingers 47 formed of plastic or metal equally spaced in an annular arrangement. A circular recess having a rectangular cross-section 53 is located inside the bottom surface of the flange 11 for the purpose of receiving the flange of a mounting hole adjustment sleeve 29 as shown in FIG. 1B. The interior conical bore of the skirt 8 is equipped with a screw threads 24 following the taper of the cone thereby establishing a tapered screw threads on the inside of the flexible fingers 47.

As further seen in FIGS. 1A and 1B, a locator key 9 with its longitudinal top surface smaller than its base is positioned on the horizontal centerline of the flange 11 of upper surface 33. An expansion sleeve 5 having a threaded exterior surface 12 having a truncated conical configuration and a cylindrical bore 13 is located within the skirt 8. The conical screw threads 12 have substantially the same pitch, thread depth and taper as the threads 24 inside the skirt 8. A number of equally spaced shallow vertical key slots are positioned within the interior bore 13 for the entire length of the expansion sleeve 5. An upper collar 7 is positioned above the flanged bushing 4 is an upper collar 7. The exterior of the upper collar 7 is ornamental with a design to compliment the general appearance of the faucet. The lower segment of the exterior of the escutcheon collar 7 has a conical exterior surface 49 with the major diameter substantially the same as the diameter of flange 11 and the minor diameter slightly smaller than the minor bore diameter 50 of the locking collar 2. The angle of the conical surface 49 is substantially the same as the angle of the interior conical surface 27 of the locking collar 2.

As further seen in FIGS. 1A and 1B, a key slot 10 is located along the horizontal center line of the base 35 of the escutcheon collar 7. The size and configuration of the key slot 10 is such that it accommodates locator key 9 on the flanged bushing 4. The cylindrical bore of the escutcheon collar 7 has an internal screw thread 25 to accommodate the exterior thread 23 on the faucet valve body 6. An annular lockdown collar 2 is positioned around the lower segment of the escutcheon collar 7 and the flanged bushing 4. The upper portion of the bore 27 of the lockdown collar 7 is conical in shape with the minor diameter of the conical portion of the bore located at the top of the plane of the lockdown collar and the major diameter slightly above the top of the cylindrical threaded 46 segment of the bore. The screw threads 46 inside the cylindrical segment of the lockdown collar 2 are substantially the same size and pitch as the threads 45 on the flanged bushing 4. The conical segment 27 of the lock down collar 2 engages the exterior conical surface 49 of the escutcheon collar 7. As the lock down collar 2 is rotated the lock down collar threads on to the flange 10 of the flanged bushing 4 forces the escutcheon collar 7 downwards onto the surface 33 of the flanged bushing 4 to engage the locator key 9 into the locator key slot 10 and thus firmly securing the escutcheon collar 7 to the flanged bushing 4. A rectangular recess 54 is located in the base of the lockdown collar 2 between the exterior and the interior diameter of the base of the lockdown collar. An "O" ring or seal 26 located within the recess 54 seals the lockdown collar 2 to the sink 21 preventing water on the sink surface to pass through the mounting hole into the space below the sink.

In FIG. 1B, the method of mounting with the expansion sleeve 5 threaded into the skirt 8 expanding the fingers 47 and locking them against the interior surface of a mounting hole is shown. On occasions the mounting hole in the sink might be larger than the standard 1¼" diameter and in this event a mounting hole adjustment sleeve 29 is used. The flange of a mounting hole adjustment sleeve 29 is located in the recess 53 with the skirt of the sleeve projecting downwards occupying the space between the flanged bushing's skirt 8 and the interior surface of the mounting hole. This method of mounting allows the faucet valve body or spout, a soap/lotion dispenser, or a water dispenser to be mounted onto a sink or counter there by saving time and inconvenience of working in cramped quarters under the sink.

Figure 4:
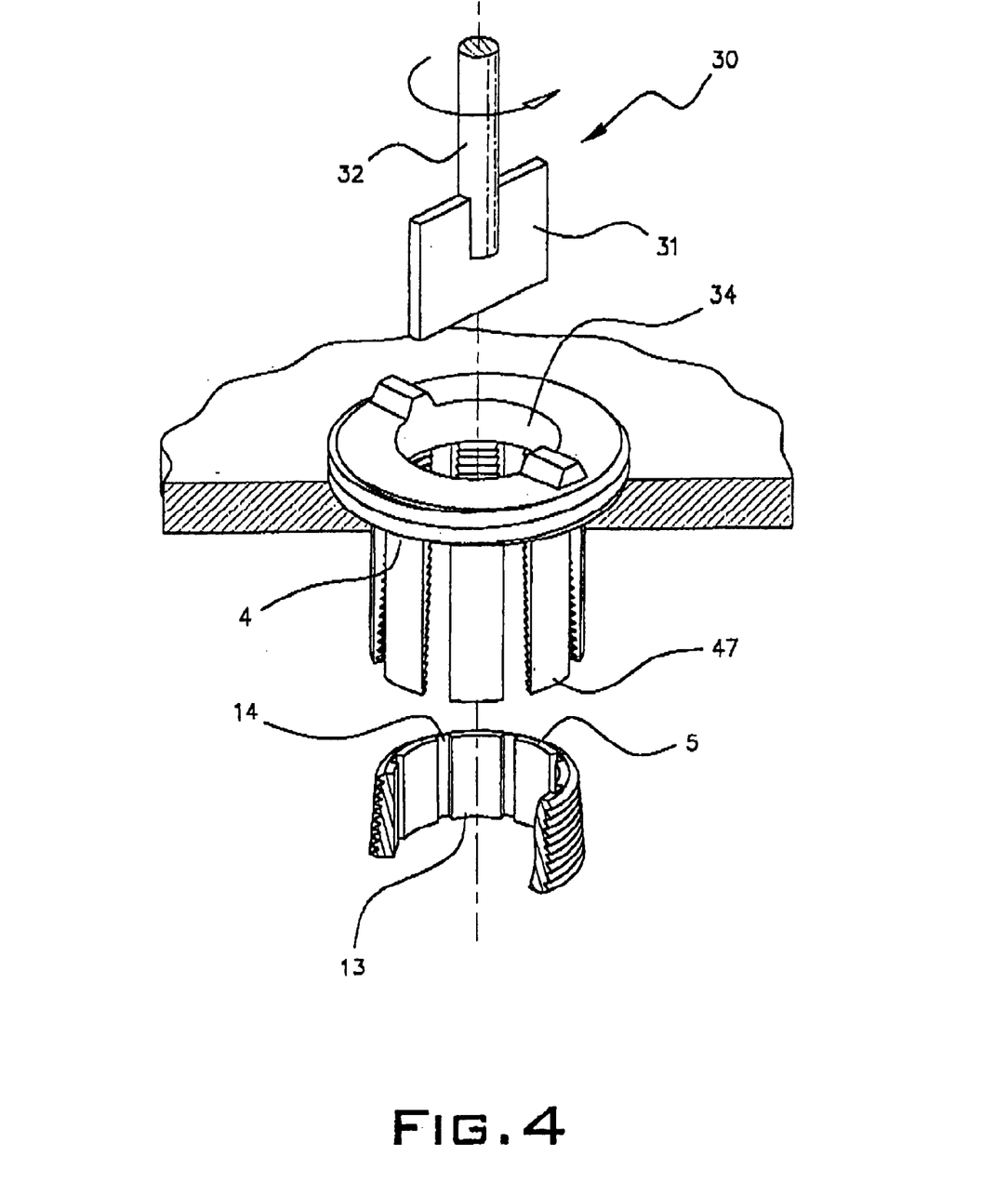
FIG. 4 is a partial exploded side perspective view, with parts in section, of the mounting assembly of FIG. 1 showing a rotatable mounting tool.

As seen in FIG. 4, a rotatable tool 30 comprises a shaft 32 and a tool blade 31. The rotatable tool 30 is lowered through the cylindrical bore 34 of the flanged bushing 4 into the bore 13 of the expansion sleeve. The tool blade 31 has a thickness slightly less than the width of vertical key slots 14 and a width of the tool blade 31 greater than the bore diameter 13 but less than the sum of the bore diameter 13 plus two times the depth of the vertical key slot 14. When the rotating tool 30 is rotated while engaged in the expansion sleeve 5, the expansion sleeve 5 moves upwards into the bushing skirt 8 and consequently expanding the skirt fingers 47 increasing the outside diameter of the bushing skirt 8 to a size greater than the diameter of the mounting hole for complete securement of the flanged bushing.

In FIG. 3 a typical faucet installation utilizing the mounting method shown in perspective with sections at mounting holes is shown. A centrally located spout 1 is secured in mounting hole 41 of the sink 21 in much of the same manner as described in FIG. 1 with the exception that there might not be a need for an escutcheon collar, and the lockdown collar 2 engages a conical annulet at the base of the spout 1. The lower body 16 of the spout has attached the hot water line 18 and the cold water line 19. The volume of water flowing through lines 18 and 19 is controlled by the hot 51 and the cold water 52 valves with the ratio of the volume determining the temperature of the water delivered by spout 1. The hot and cold water valves are secured in mounting holes 40 and 42 respectively in the same manner as described in FIG. 4.

Figure 2:
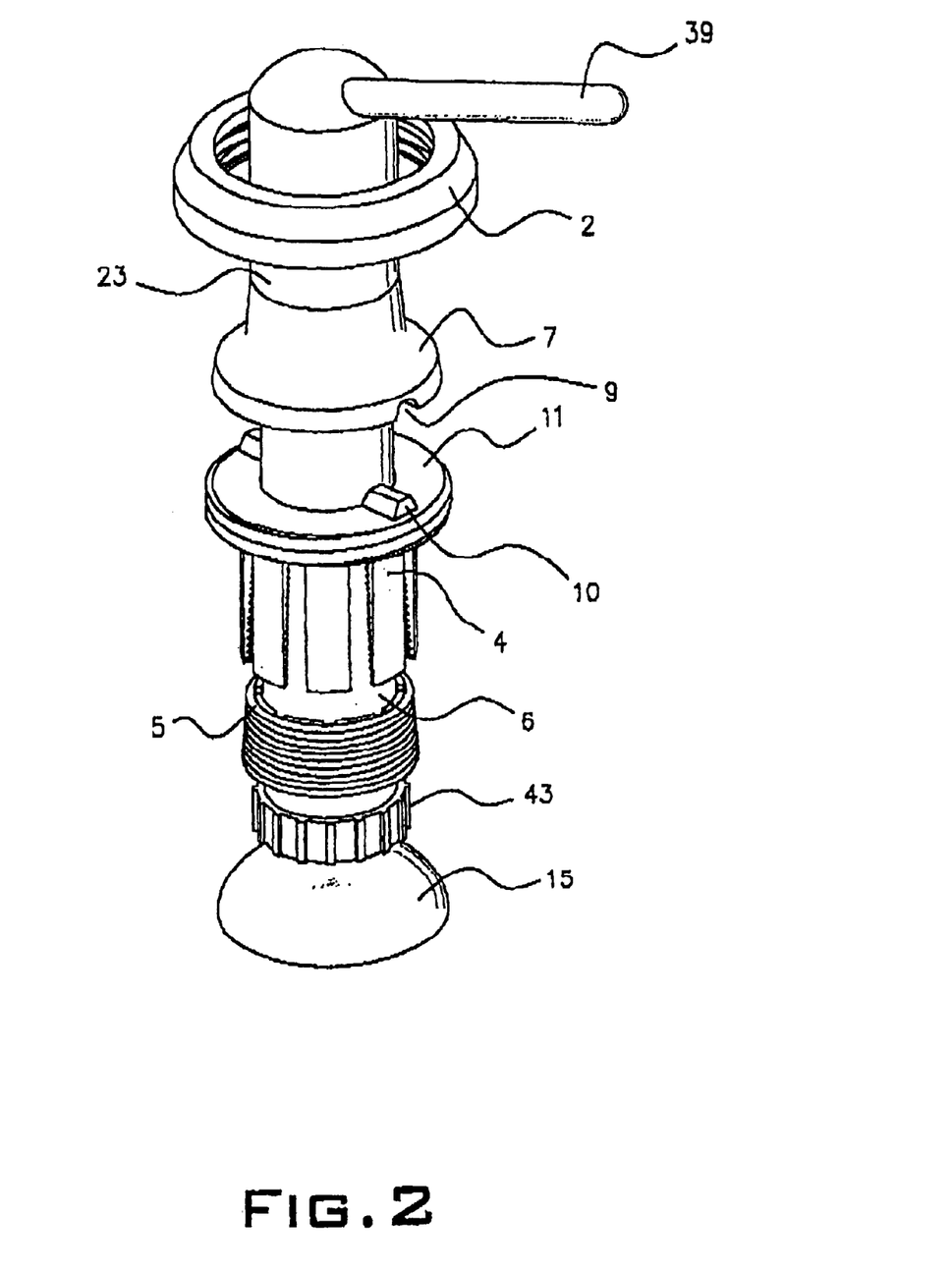
FIG. 2 is a side perspective view, with parts exploded, of the mounting assembly of FIG. 1 for mounting a valve assembly.
Figure 5:
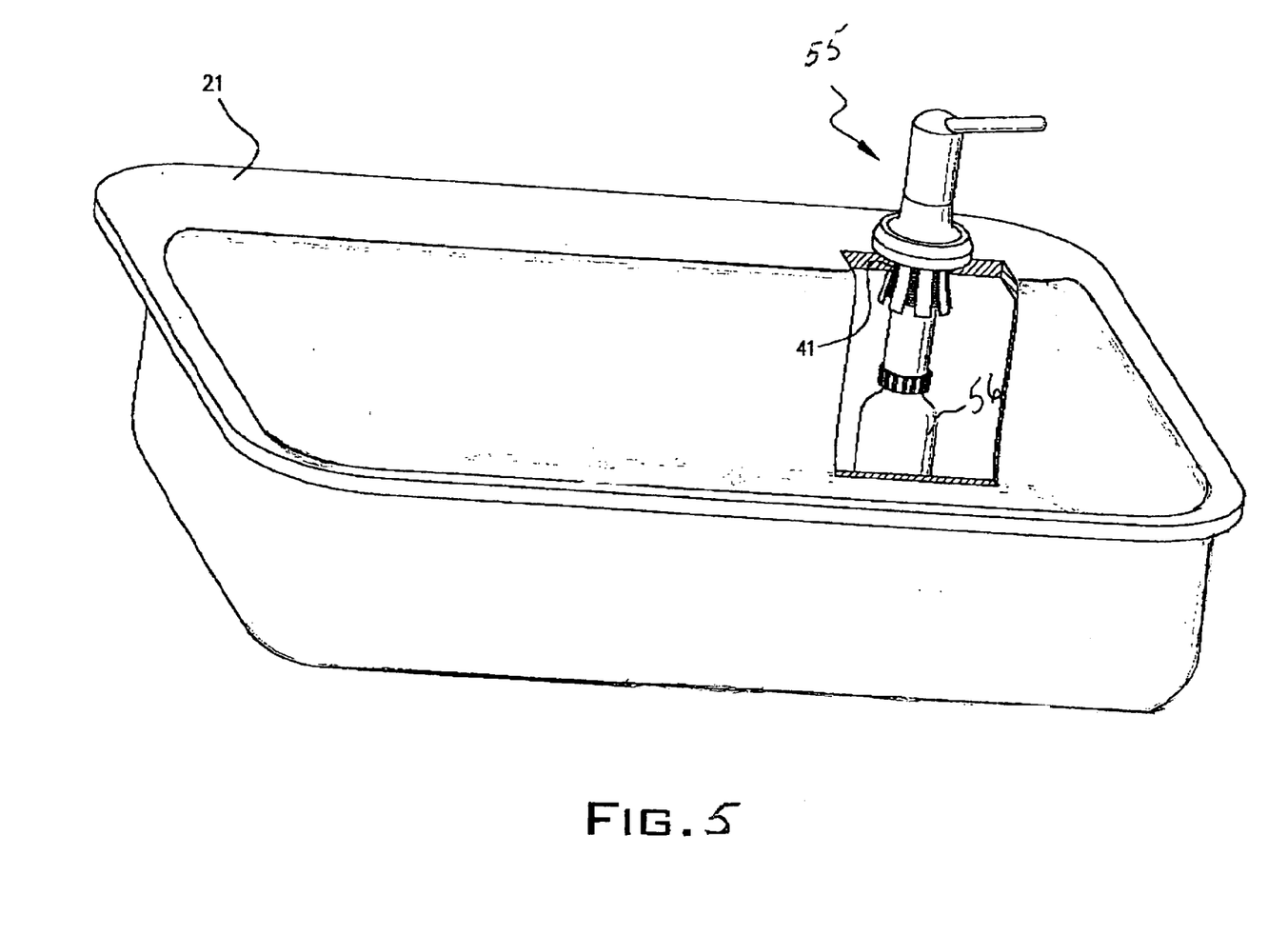
FIG. 5 is a front perspective view, with parts in section, of the mounting assembly of the invention mounting a soap/lotion dispenser.

FIGS. 2 and 4 show an exploded parts view of a faucet valve utilizing the mounting assembly and method. In FIGS. 2 and 4 a faucet valve body 6 with an upper threaded segment 23 and a cylindrical lower segment 6 with a diameter slightly smaller than the minor pitch diameter of threaded segment 23, has an escutcheon collar 7 threaded onto its threaded segment 23. A valve handle 3 is secured to the valve by means of a spline bore within the handle 3 which fits onto the shaft spline 15 and held down by means of a screw 39 which is threaded into the screw hole 43 inside spline shaft 15. The flanged bushing 4 is secured to the sink as shown in FIG. 2, after which the faucet valve body 6 with escutcheon collar 7 attached is lowered through the bores of the flanges bushing 4 and the expansion sleeve 5. When the locating key 10 is engaged in locating key slot 9 in the escutcheon collar 5, the lockdown collar 2 is lowered over the escutcheon collar and threaded on the flange 11 of the flanged bushing 4, thereby securing the escutcheon collar and valve body to the sink surface. The valve handle 5 is attached to the valve stem 15 after the valve assembly is secured to the sink In FIG. 5 there is illustrated a soap/lotion dispenser assembly 55 having a bottle 56 for soap, lotion, and the like mounted on the sink 21. The soap/lotion dispenser 55 is mounted in generally identical manner by the mounting assembly and method as previously described with reference to FIGS. 1A, 1B, 2 and 4.

Figure 6:
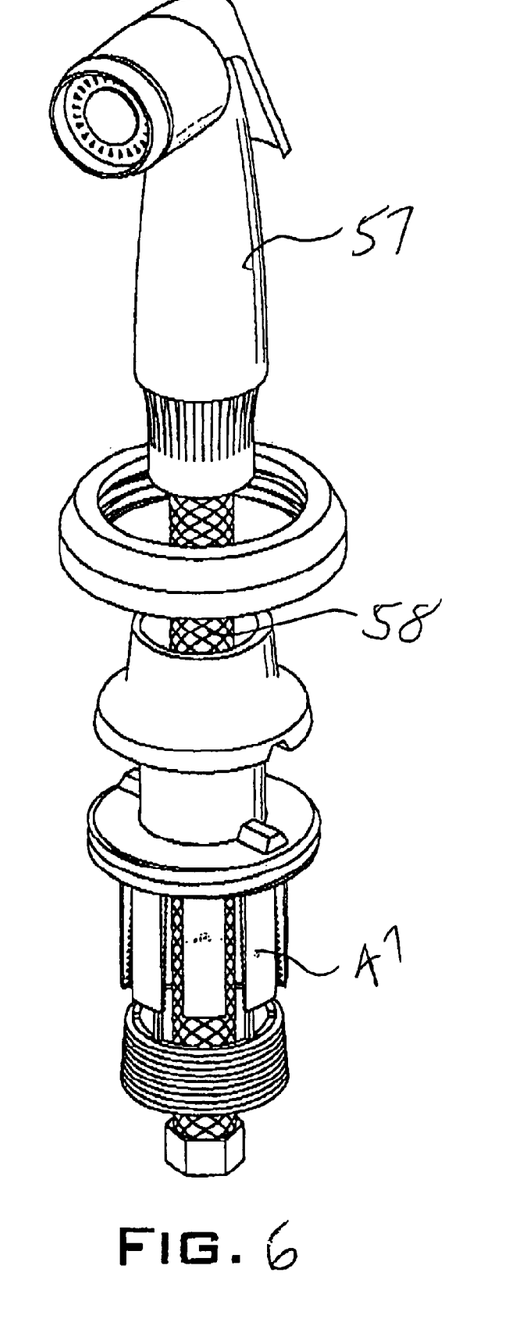
FIG. 6 is a front perspective view of a water sprayer utilizing the mounting assembly and method of the invention.
Figure 7:
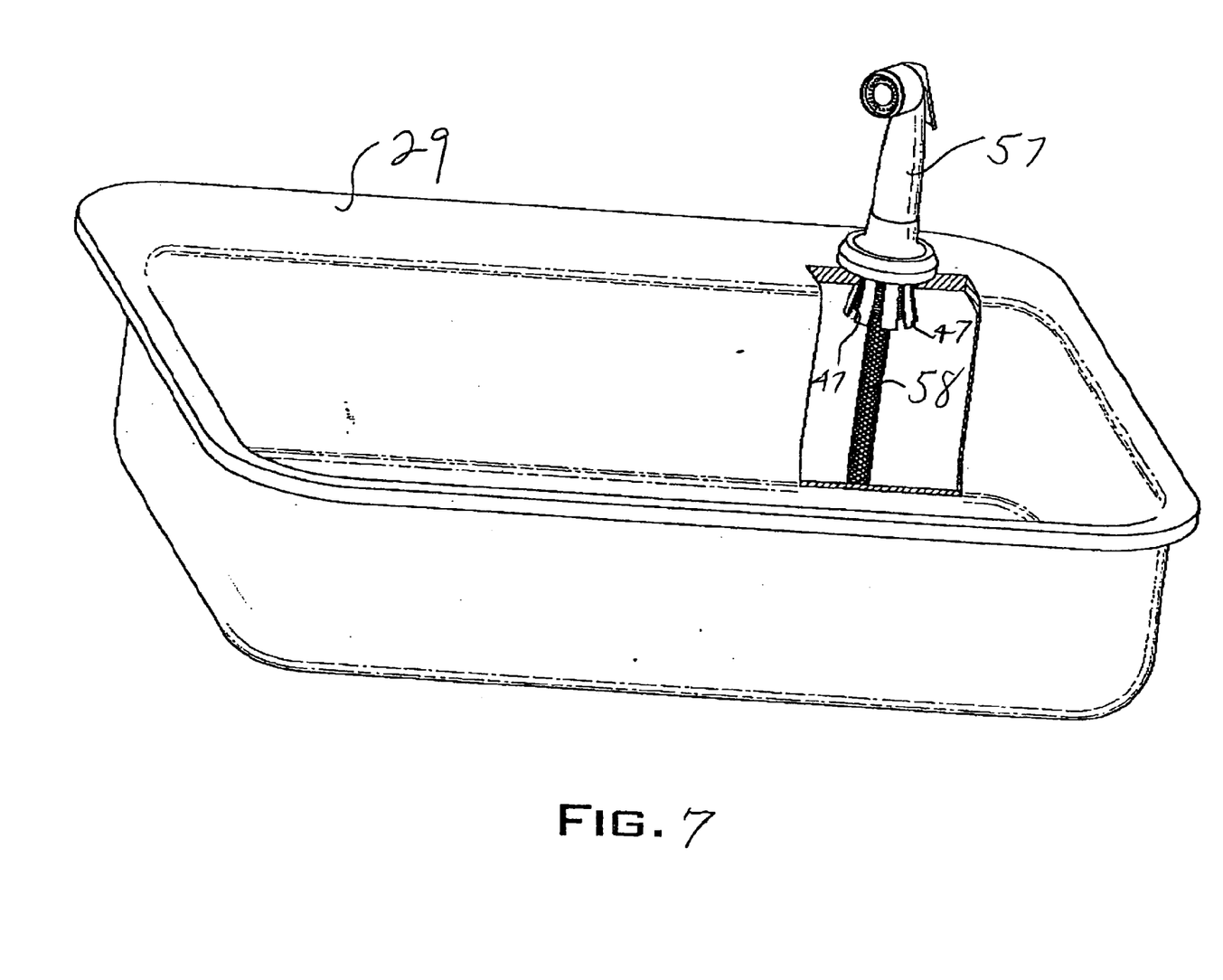
FIG. 7 is a front perspective view of a water sprayer utilizing the mounting assembly and method of the invention shown mounted on a sink.

In FIGS. 6 and 7, there is illustrated a water sprayer or dispenser 57 have a water hose 78 for dispensing water or filter and water mounted on sink 21. The soap/lotion dispenser 57 is mounted generally identical in a manner by the mounting assembly and method as previously described with reference to FIGS. 1A, 1B, 2 and 4.

What is claimed is:

1. A mounting assembly for completely mounting a liquid delivery device through a mounting hole of the top of a support surface solely by insertion from the top of the support surface comprising;
    a flanged expandable bushing arranged to be inserted through the mounting hole from the top of the support surface for mounting a liquid delivery device,
    said expandable bushing having a lower skirt extending below the lower surface of the support member,
    said skirt having a plurality of expandable members,
    said expandable bushing further having a threaded central circular bore,
    a hollow expansion sleeve being moveably received in said threaded bore,
    said expansion sleeve having a threaded exterior surface for engaging said threaded bore,
    said expansion sleeve being moveable relative to said expanding bushing to urge said expandable members outward to assume a diameter greater than the size of the mounting hole for mounting of the flanged bushing beneath the support surface for securement to the support member, and
    means for rotating said expansion sleeve relative to said flanged bushing to cause said movement of said expansion sleeve relative to said flanged expanding bushing.

2. The mounting assembly according to claim 1 wherein said threaded outer surface of said expansion sleeve and said threaded bore have a truncated conical configuration for urging said expandable members outward.

3. The mounting assembly according to claim 2 wherein said expandable members are a plurality of flexible fingers.

4. The mounting assembly according to claim 2 further including a flange on said flanged bushing, said flange having a circular configuration and a flat lower surface for contacting the upper surface of the support member.

5. The assembly according to claim 4 further comprising a locking collar including an opening having interior threads, said flanged bushing having a threaded periphery for engaging said the interior threads of said locking collar, said locking collar being moveable relative to said flange through rotation of said locking collar relative to said flange for locking said flanged bushing on the upper surface of the support member.

6. The mounting assembly according to claim 5 further comprising an upper collar having a threaded bore in alignment with the bore of said flanged bushing for receiving the liquid delivery device, said upper collar being secured to said locking collar.

7. The mounting assembly according to claim 6 wherein said upper collar has a lower cylindrical portion for contacting the top of said flanged bushing, said cylindrical portion having a periphery having a conical shape, said locking collar having an upper conical shape in said threaded bore for engaging and locking said upper collar.

8. The mounting assembly according to claim 2 wherein said threaded exterior of said expansion sleeve includes a plurality of vertical key slots, said means for rotating said expansion sleeve comprises a rotatable tool.

9. The mounting assembly according claim 8 wherein said rotatable tool includes a shaft selectively extending through said bore of said flanged bushing and a blade for engaging a pair of said key slot for rotating said expansion sleeve through rotation of said shaft.

10. The mounting assembly according to claim 9 wherein the liquid delivery device is a water faucet.

11. The mounting assembly according to claim 9 wherein the liquid delivery device is a soap/lotion dispenser.

12. The mounting assembly according to claim 9 wherein said liquid delivery system is a water dispenser.

13. The mounting assembly according to claim 1 wherein said support member is either a sink top or a tub counter.

14. A method of mounting a liquid delivery device having a downwardly descending hose on a bushing inserted downward through the mounting holes of a support surface having upper and lower surfaces comprising the steps of
    inserting a flanged bushing having a lower expandable skirt and a threaded central bore having a truncated conical configuration through the mounting hole of the support member,
    inserting an exteriorly threaded expansion sleeve into threaded engagement with said threaded central bore of said flanged bushing,
    attaching a locking collar on said flanged bushing to lock said bushing to the top of the upper surface,
    inserting a tool into said threaded bore of said bushing into engagement with said expansion sleeve, and
    rotating said expansion sleeve relative to said threaded central bore to cause movement of said expansion sleeve and wedge said expandable skirt outward to a diameter greater that the diameter of the mounting hole for the sole mounting of said flanged bushing.

15. The method according to claim 14 wherein said threaded periphery of said expansion sleeve has a plurality of vertical slots, inserting said tool having a lower blade and an upper extending shaft into said threaded central bore to allow said blade to contact a plurality of vertical slots, rotating said shaft for causing rotation of a said expansion sleeve for relative wedging movement of said expandable skirt outward.

16. The method according to claim 15 further mounting an upper collar on said locking collar, mounting the liquid delivery device on said upper collar with said hose descending downward through the central bore of said flanged bushing and said expansion sleeve.

17. The method according to claim 14 said flanged bushing is inserted through the mounting hole of a sink.

18. The method according to claim 17 wherein said flanged bushing is inserted through the mounting hole of said sink.

19. The method according to claim 17 wherein said water delivery device is a multiple valve faucet assembly inserted in multiple mounting holes of said sink.

20. The method according to claim 17 wherein said liquid delivery device is a soap/lotion dispenser having a lower conduit descending through said central bore and said expansion sleeve.

21. The method according to claim 17 wherein said liquid delivery is a water dispenser having a lower conduit descending through said central bore and said expansion sleeve.

* * * * *